(12) United States Patent
Nieh et al.

(10) Patent No.: US 11,431,172 B2
(45) Date of Patent: Aug. 30, 2022

(54) CONTROL SYSTEM FOR USE IN CONTROLLING OPERATION OF AN ELECTRICAL APPLIANCE

(71) Applicants: DEFOND ELECTECH CO., LTD, Guangdong (CN); DEFOND COMPONENTS LIMITED, Chai Wan (HK)

(72) Inventors: Cheng Chen Nieh, Chai Wan (HK); Kai Kei Poon, Chai Wan (HK); Kwok Hang Leung, Chai Wan (HK); Man Kit Mok, Chai Wan (HK); Ka Shing Anthony Yuen, Chai Wan (HK)

(73) Assignees: DEFOND ELECTECH CO., LTD, Guangdong (CN); DEFOND COMPONENTS LIMITED, Chai Wan (HK)

(*) Notice: Subject to any disclaimer, the term of this patent is extended or adjusted under 35 U.S.C. 154(b) by 0 days.

(21) Appl. No.: 16/596,238

(22) Filed: Oct. 8, 2019

(65) Prior Publication Data
US 2020/0119552 A1    Apr. 16, 2020

(30) Foreign Application Priority Data
Oct. 11, 2018  (HK) .................. 18113037.8

(51) Int. Cl.
*H02J 3/14*       (2006.01)
*G05B 15/02*      (2006.01)
*G05B 19/042*     (2006.01)

(52) U.S. Cl.
CPC ............... *H02J 3/14* (2013.01); *G05B 15/02* (2013.01); *G05B 19/042* (2013.01); *H02J 2310/14* (2020.01)

(58) Field of Classification Search
CPC .................................................... G05B 19/042
(Continued)

(56) References Cited

U.S. PATENT DOCUMENTS

| 6,198,079 B1* | 3/2001 | Essig ............... F24C 7/082 |
| | | 219/413 |
| 2003/0178290 A1* | 9/2003 | Schilling ......... F24C 7/083 |
| | | 200/6 A |

(Continued)

FOREIGN PATENT DOCUMENTS

| CN | 201369094 Y | 12/2009 |
| CN | 202134966 U | 2/2012 |

(Continued)

OTHER PUBLICATIONS

Abdolkhani, Ali. "Fundamentals of inductively coupled wireless power transfer systems." Wireless Power Transfer—Fundamentals and Technologies (2016): 25. (Year: 2016).*

(Continued)

*Primary Examiner* — Mohammad Ali
*Assistant Examiner* — Joshua T Sanders
(74) *Attorney, Agent, or Firm* — Bryan D. Zerhusen; Nicholas R. Herrel; Cantor Colburn LLP (57) ABSTRACT

A control system for use in controlling operation of an electrical appliance, including: an electrical appliance housing having a control module; and a power source; a control knob including: an attachment element configured for releasably attaching the control knob to an outer surface of the housing; and an input/output module; a wireless power transfer system configured for wirelessly transferring power from the power source through the electrical appliance housing and to the input/output module for use in powering the input/output module; and a wireless control signaling module configured for wirelessly communicating a control (Continued)

signal from the control knob through the housing to the control module within the electrical appliance housing, said control signal received by the control module being indicative of an operational position/state of the control knob, and whereby said control module is configured for controlling operation of the electrical appliance by reference to the received wireless control signal.

13 Claims, 4 Drawing Sheets

(58) Field of Classification Search
USPC .......................................................... 700/86
See application file for complete search history.

(56) References Cited

U.S. PATENT DOCUMENTS

| | | | |
|---|---|---|---|
| 2009/0037742 A1* | 2/2009 | Narayanaswami | G07C 9/37 713/186 |
| 2013/0279769 A1* | 10/2013 | Benkley, III | G06K 9/001 382/124 |
| 2016/0378131 A1* | 12/2016 | Battlogg | F16H 59/0217 74/553 |
| 2017/0060170 A1 | 3/2017 | Starr | |
| 2020/0085238 A1* | 3/2020 | Drake | H04W 4/33 |

FOREIGN PATENT DOCUMENTS

| | | |
|---|---|---|
| CN | 102570623 A | 7/2012 |
| CN | 102638110 A | 8/2012 |
| CN | 202979306 U | 6/2013 |
| CN | 103427244 A | 12/2013 |
| CN | 106230131 A | 12/2016 |
| CN | 106451814 A | 2/2017 |
| CN | 106679613 A | 5/2017 |
| DE | 102010039559 A1 | 2/2012 |
| GB | 2410541 A | 8/2005 |
| JP | 2004-003819 A | 1/2004 |
| JP | 2005-282920 A | 10/2005 |
| JP | 2005282920 A * | 10/2005 |
| JP | 2010-535386 A | 11/2010 |
| JP | 2011-041462 A | 2/2011 |
| JP | 2014-202837 A | 10/2014 |
| JP | 2017-215050 A | 12/2017 |
| WO | WO 2017/094234 A1 | 6/2017 |

OTHER PUBLICATIONS

Extended European Search Report dated May 28, 2020, for EP 19201338.1.
Chinese Patentability Search Report dated Apr. 15, 2019, for CN Application Serial No. 18113037.8 filed Oct. 15, 2018.
First Office Action dated Nov. 4, 2020 for Japanese patent application No. 2019-184660 (with Translation).
Second Office Action dated Jun. 29, 2021 for Japanese patent application No. 2019-184660 (with Translation) Related Applications.

* cited by examiner

CONTROL SYSTEM FOR USE IN CONTROLLING OPERATION OF AN ELECTRICAL APPLIANCE

CROSS-REFERENCE TO RELATED APPLICATION

The present Application claims the benefit of Hong Kong Patent Application No. 18113037.8, titled: A Control System for Use in Controlling Operation of an Electrical Appliance, filed on 11 Oct. 2018, the contents of which are incorporated herein by reference.

BACKGROUND OF THE INVENTION

Field

The present invention relates to control systems for use in controlling operation of an electrical appliance.

Background

Electrical appliances such as stove tops, ovens washing machines and the like typically include a control panel having a control knob mounted thereon that are operable to control functioning of the appliance. The control knob may contain electronic components which may also be physically and electrically connected with other electronic control circuitry inside of a housing of the electrical appliance. As such control knobs are susceptible to ingress of dust, liquids and other particulates this damages the electronic components and results in inaccurate or erratic control operation.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides a control system for use in controlling operation of an electrical appliance, the control system including: an electrical appliance housing having disposed therein: a control module; and a power source; a control knob including: an attachment element configured for releasably attaching the control knob to an outer surface of the housing; and an input/output module; a wireless power transfer system configured for wirelessly transferring power from the power source through the electrical appliance housing and to the input/output module for use in powering the input/output module; and a wireless control signaling module configured for wirelessly communicating a control signal from the control knob through the housing to the control module within the electrical appliance housing, said control signal received by the control module being indicative of a an operational position or operational state of the control knob, and whereby said control module is configured for controlling operation of the electrical appliance by reference to the received wireless control signal.

Preferably, the input/output module may include at least one of a rotational encoder module, a biometric scanner module, a motion/gesture sensor module, an electronic display module, and a voice-input control module.

Preferably, the electronic display module may include a touch-sensitive electronic display module.

Preferably, the wireless control signaling module may be operably-connected to the input/output module and the wireless control signal may be configured to include information indicative of an input received by the input/output module.

Preferably, the input/output module may include at least one of a vibration output module, a sound output module, a light output module, and an electronic display module.

Preferably, the control module may be configured to at least partially restrict operation of the electrical appliance in response to the control knob being detached from the outer surface of the housing.

Preferably, the control module may be configured to receive the wireless control signal from the wireless control signaling module, said control signal including information indicative of an input received by the input/output module, and whereby the control module is configured to at least partially restrict operation of the electrical appliance if the information does not match a predetermined matching criteria.

Preferably, the information indicative of the input received by the input/output module may include biometric information received by the biometric scanner module of the input/output module.

Preferably, the attachment element may be configured for releasably attaching the control knob to the outer surface of the housing includes a magnetic attachment element.

Preferably, the wireless power transfer system may be configured to transfer power by way of at least one of inductive coupling and capacitive coupling.

Preferably, the wireless control signaling module may include a radio frequency control signaling module.

Preferably, the radio frequency control signaling module may include at least one of a Bluetooth®, Wi-Fi® and a Zigbee based radio frequency transmitter.

Preferably, the present invention may include a computing device remote from the control system that may be configured to run a user interactive interface thereon via which a user may interact with the control system.

In a second broad form, the present invention provides a control knob configured for use with a control system in accordance with the first broad form of the present invention.

In a third broad form, the present invention provides a control module configured for use with a control system in accordance with the first broad form of the present invention.

It would be understood from the preceding that the various broad forms of the present invention may assist in providing at least one advantage over the existing art. For instance, the detachability of the control knob from the control panel of the electrical appliance housing allows for ease of cleaning of the electrical appliance surface, or, for repair or replacement of the control knob. Furthermore, the wireless power transfer and control signaling between the control module and the control module within the electrical appliance housing provides for a cleaning and tidier interface alleviating the need for physical/mechanical wiring and interconnections. A safety off function is provided whereby the electrical appliance may be configured to automatically switch off when the control knob is detached from the electrical appliance housing and/or when the biometric scanner fails to sense a predetermined biometric signature of a user. Yet further, embodiments of the present invention may allow a user to remotely monitor and/or remotely control operation of the electrical appliance via a portable computing device such as a smartphone which may be configured for wireless communication with the control knob or control module of the electrical appliance.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF THE PREFERRED EMBODIMENTS

Preferred embodiments of the present invention will now be described herein with reference to FIGS. 1A to 4. The embodiments comprise aspects of a control system for use in controlling operation of an electrical appliance such as a stove top, an oven, a washing machine, microwave oven or the like. It would be appreciated and understood that alternate embodiments of the present invention may be used with other types of electrical appliances, machines and devices.

Figure 1A:
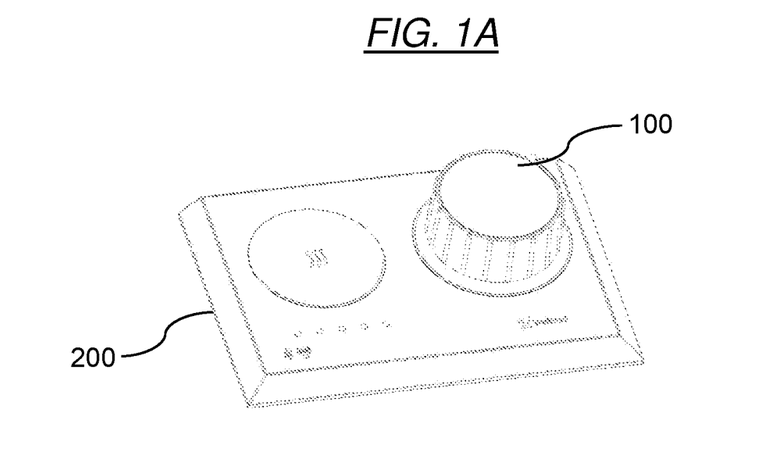
FIG. 1A shows a control knob attached to a control panel surface of an electrical appliance housing in accordance with an embodiment of the present invention.
Figure 1B:
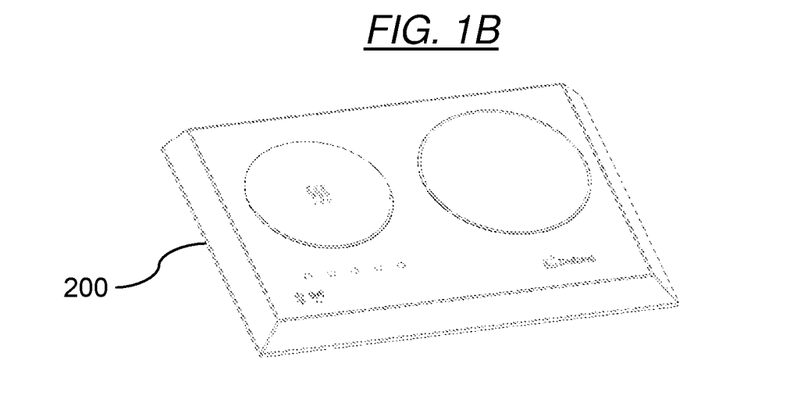
FIGS. 1B and 1C shows the control panel surface and control knob of FIG. 1A in stand-alone form detached from one another.
Figure 1C:
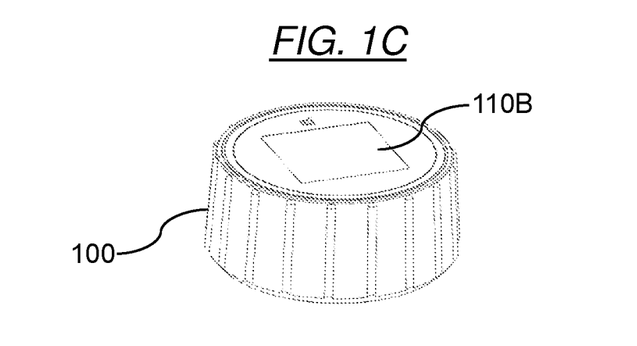
Figure 2:
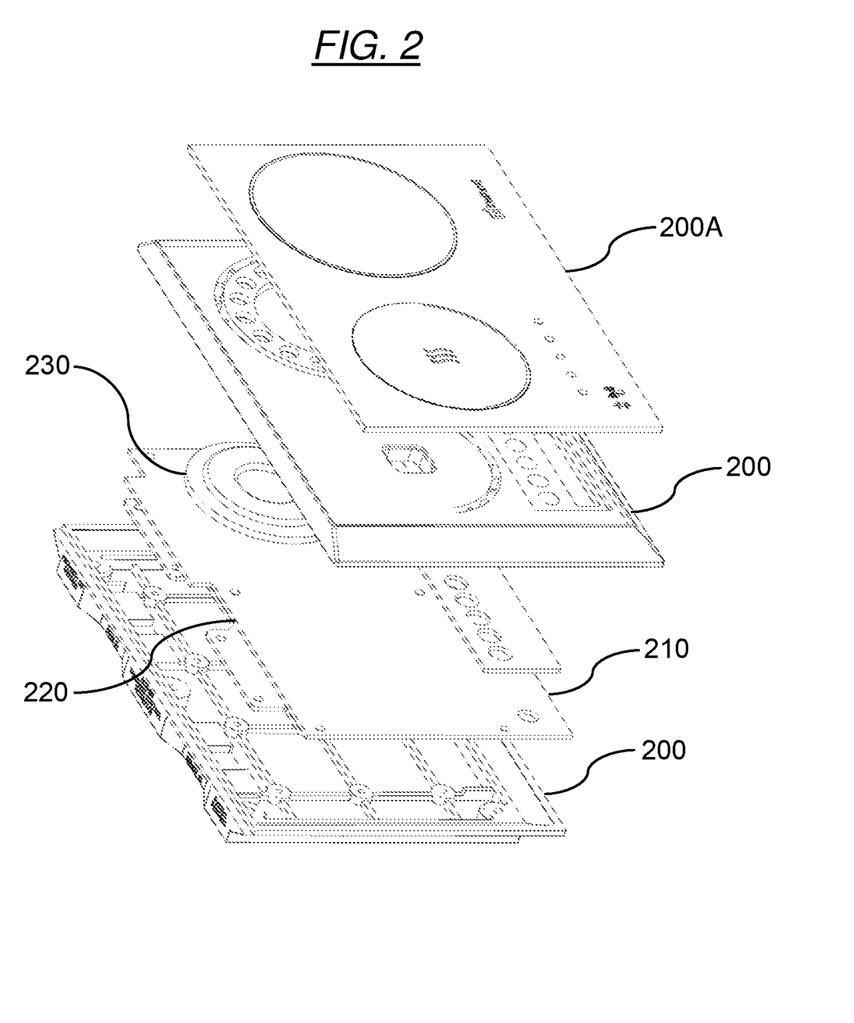
FIG. 2 shows an exploded view of the electrical appliance housing in accordance with the embodiment of FIG. 1A.
Figure 3:
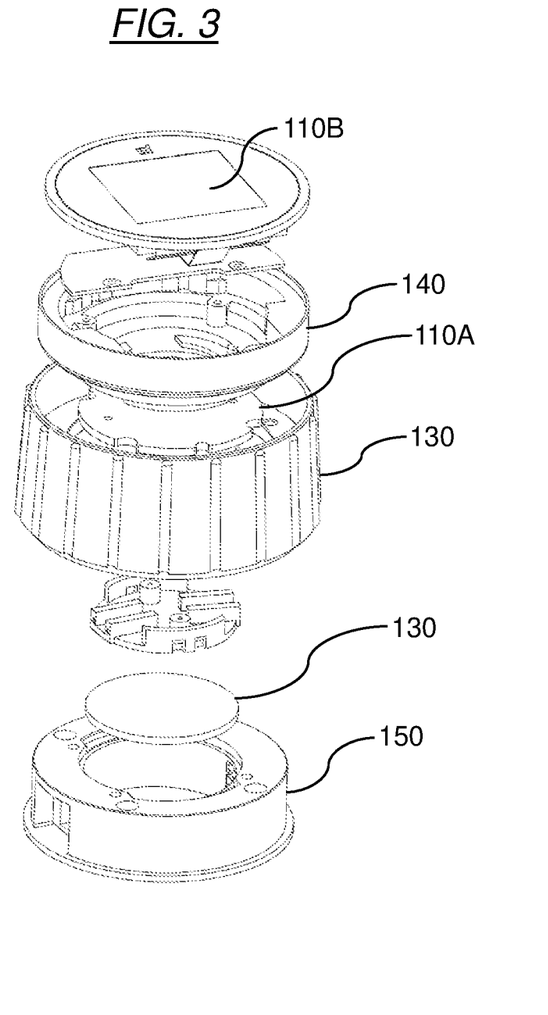
FIG. 3 shows an exploded view of the control knob in accordance with the embodiment of FIG. 1A.

FIG. 1A shows an example embodiment of the control system with a control knob (100) releasably attached to a control panel surface (200A) on the housing (200) of an electrical appliance. Referring to FIG. 2, it can be seen that the electrical appliance housing (200) encloses therein a control module (210), a power source (220) and a wireless power transmitter assembly (230). Referring to FIG. 3, the control knob (100) comprises an input/output module (110) and its associated electrical circuitry (110A), and a wireless power receiver assembly (120) for wirelessly receiving power from the power source (220) via the wireless power transmitter assembly (230) so as to power the control knob components. The control knob (100) also comprises a base housing (130) and a top housing (140) that are configured to at least partially enclose an input/output module (110), its associated electrical circuitry (110A), and the wireless power transfer receiver assembly (120). The control knob (100) further includes an attachment element (150) comprising a ring-shaped permanent magnet movably connected to the base housing (130) which is configured for magnetic coupling with the control panel (200A) disposed on the electrical appliance housing (200). The magnetic field strength of the permanent magnet should be selected of suitable magnitude to effect magnetic coupling with the control panel surface (200A) of the housing (200) so that it is securely attached thereto yet is able to be readily detached from the control panel surface (200) of the electrical appliance housing (200) by force of a user's hand, for instance, when cleaning the control panel surface (200). In alternate embodiments of the present invention, other suitable types of attachment elements may be utilised to releasably attach the control knob (100) to the control panel surface (200) of the electrical appliance housing. For instance, the control knob (100) may be configured for releasable attachment by way of any suitable mechanical type securement mechanism, friction-fitting securement mechanism, or adhesive type securement, with the control panel surface (200) disposed on the electrical appliance housing (200).

The input/output module (110) of the control knob (100) include input means such as a rotational encoder module, a biometric scanner module, a motion/gesture sensor module, a touch-sensitive electronic display module (110B), and in certain embodiments, a voice-input control module. A user may enter input commands via any one of the various input means of the input/output module (110) of the control knob (100) which are then processed and converted into control signals by the associated electrical circuitry (110A) disposed in the control knob (100) and then wirelessly communicated to the control module (210) within the housing via a wireless communication system. The wireless communication system in this embodiment is configured to communicate the control signals using a Bluetooth® type wireless communication protocol transceivers operably-connected to the control module (210) and control module input/output module (110A), although in other embodiments, any other wireless communication protocol may be used such as Wi-Fi®, Zigbee® and the like. Upon receiving the wireless control signals form the control knob (100) the control module (210) is configured to control operation of the various components and systems of the electrical appliance by reference to the received wireless control signals. The input/output module (110) of the control knob (100) also includes output means such as a vibration output module, a sound output module, and a light output module each of which are configured to output vibratory, sound and light outputs respectively for instance to indicate particular states of operation of the electrical appliance. In addition to serving as an input means for receiving user input commands via a graphical user interface for controlling operation of the electrical appliance, the touch-sensitive display module (110B) is also configured for displaying information on the graphical user interface that is indicative of the operational state of the electrical appliance at any given time. In alternate embodiments of the present invention, the control knob need not necessarily include a touch-sensitive display module and may include for instance a non-touch sensitive electronic display module, or may even comprise a simple lighting unit such as one or more LED modules configured for operation to output light or visual signals indicative of the status of operation of the electrical appliance.

Both the control module (210) within the electrical appliance housing and the control knob input/output module circuitry (110A) are also configured for communication with an external computing device such as a smartphone, a laptop computer or a table device. A software application may be downloadable on to the computing device and executable on the device to provide a user-interactive graphical user interface via which a user may receive information from the control module (210) and/or control knob (100) via a wireless communication link that is indicative of the current state of operation of the electrical appliance, or, an operational state of the control knob (100). The wireless communication link may be configured to operate based on a Bluetooth®, Wi-Fi® or Zigbee® compatible protocol. The graphical user interface operable on the computing device may also be configured to allow the user to enter control commands which the computing device is configured to suitable convert in to control signals and wirelessly communicate the control signals to the control knob (100) and/or control module (210) to enable remote user control of the electrical appliance via the computing device.

When the attachment element (150) of the control knob (100) is magnetically secured to the control panel surface (200) of the electrical appliance housing (200) it remains in fixed relative position with the top housing (140) of the control knob (100) whilst the base housing (130) of the control knob (100) disposed therebetween is rotatable relative to both the attachment element (150) and the top housing (140) of the control knob (100). The control knob (100) includes a detent mechanism to provide controlled incremental rotatable movement of the base housing (130) of the control knob (100) relative to the attachment element (150) and the top housing (140) of the control knob (100). The rotational movement of the base housing (130) of the control knob (100) serves as one of several user input means whereby the rotational positions of the base housing (130) are converted by a rotational encoder and associated electrical circuitry (110A) into suitable control signals that are able to be wirelessly communicated via the wireless communication system to the control module (210) within the electrical appliance housing (200). Upon receiving the wireless control signals from the control knob (100), the control module (210) of the electrical appliance is configured to control operation of the electrical appliance by reference to the receiving wireless control signals. The control signals generated in response to rotational movement of the base housing (130) may also be fed in to a local processor module in the control knob (100) which may for instance be used to control navigation and selection of menu items that are displayed on a graphical user interface on the touch-sensitive display (110B) to actuate operation of various functions of the electrical appliance. In alternate embodiments, the control knob (100) may be implemented in different shapes and configurations and may comprise of one or a plurality of component parts that may be configured for rotational, swiveling, slidable and depressible movement. Any such movement, or configurations of the control knob (100) may be suitably converted into control signals by the input/output module electrical circuitry (110A) to ultimately control operation of the electrical appliance via the control module (210) of the electrical appliance.

Figure 4:
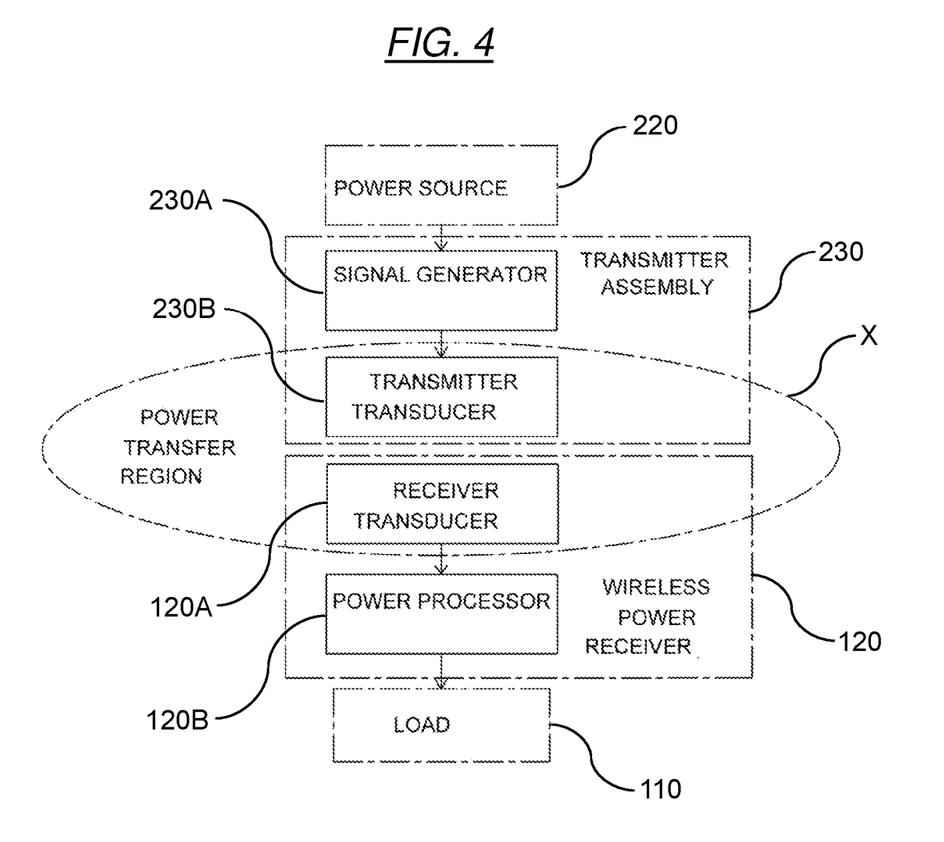
FIG. 4 shows a functional block diagram of a wireless power transfer system used in accordance with an embodiment of the present invention.

In this embodiment, the control knob (100) does not comprise any local pre-storage energy devices. Instead, a wireless power transfer system comprised by the wireless power transmitter assembly (230) and the wireless power receiver assembly (120) enables transferring of electrical power from the power source (220) within the electrical appliance housing through the housing surface and to the control knob (100) to power the input/output module (110), it's associated electrical circuitry (110A) and any other electrical components of the control knob (100) in real time. The wireless power transfer system (120,230) may be configured to effect wireless power transfer to one control knob (100) or multiple control knobs simultaneously such that multiple control knobs may be used to interact with the control module (210) to effect control various functions of the electrical appliance simultaneously. The wireless power transmitter assembly (230) is configured for connection with the power source (220) within the electrical appliance housing, and, the wireless power receiver assembly (120) is configured for connection with the control knob (100) electrical components. The wireless power transmitter assembly (230) includes a signal generator (230A) and a transmitter transducer (230B) that are operably-connected together. The wireless power receiver assembly (120) includes a receiver transducer (120A) and a power processor (120B) that are operably-connected together. Whilst in this example embodiment the wireless power transfer module is based on inductive-coupling, in other embodiments it is possible to utilised any other suitable wireless power transfer technology including for instance technology based on capacitive-coupling instead.

The signal generator (230A) transmits a transmission signal to the transmitter transducer (230B). The transmitter transducer (230B) may be an antenna formed as a conductive coil or loop formed by an electrical conductor that conducts the transmission signal. In some examples, the conductor may extend in any appropriate configuration, with part or all of the conductor being unshielded and ungrounded for producing a magnetic field in a power transfer region (X). The portion of the conductor producing the magnetic field may be in a configuration other than a continuous loop and may produce one or more power transfer regions along its length. The conduction of the transmission signal along a length of the electrical conductor forms the power transfer region (X) along the conductor length. The signal generator (230A) of the wireless power transmitter assembly (230) is configured for electrical connection to the power source (220). The power source (220) supplies an electrical first power signal to the signal generator (230A). For example, the power source (220) may be electrically connected to a receiving port of the signal generator (230A). In an embodiment, the power source (220) is an AC power source having a predetermined voltage and a predetermined frequency. The signal generator (230A) is configured to receive the first power signal from the power source (220). The signal generator (240A) is an electronic device that generates an alternating current transmission signal from the first power signal. In some embodiments, the signal generator (230A) is a power and frequency adjustable signal generator. The signal generator (230A) is configured to be electrically connected to the transmitter transducer (230B). In addition, the transmitter transducer (230B) may extend to a position disposed an appropriate distance from the signal generator (230A). The appropriate distance may be a pre-determined distance such that the signal generator (230A) lies outside the power transfer region (X). In an, embodiment, terminals of the transmitter transducer (230B) are connected to corresponding ports of the signal generator (230A).

When the control knob (100) is attached to the control panel surface (200A) of the electrical appliance housing (200), the wireless power receiver (130A) is positioned within a power transfer region (X) whereby the wireless power receiver (130) in the control knob (100) is inductively coupled with the wireless power transmitter (230) such that the wireless power receiver (130) is able to draw power from the magnetic field. In addition, the magnetic field produced by the electrical conductor induces a voltage on terminals of the receiver transducer (120A) which can be electrically connected with a load (110,110) comprising the control knob electrical components (110,110A). In this embodiment, the control knob (100) electrical components are directly powered from the terminals of the receiver transducer (130A) via suitable power interfacing circuitry. However, in alternative embodiments, it is possible that the control knob (100) may include a rechargeable battery which is charged in real-time from the terminals of the receiver transducer (130A) and which is then used to power the internal electrical components of the control knob (100).

In this embodiment, the control knob (100) may be configured to serve a safety function as a key which must be attached to a predetermined position on the control panel surface (200A) in order to enable operation of the electrical appliance. For instance, the control module (210) may include a sensor module configured to sense when the control knob (100) has been detached from the control panel surface (200A) of the electrical appliance housing (200). For instance, a proximity sensor may be used to sense the relative positioning of the control knob (100) relative to the control module (210) whereby upon sensing detachment of the control knob (100), the control module (210) is configured to automatically output control signals to various systems and components of the electrical appliance which restrict partial or full operation of the electrical appliance. Additionally, and/or alternatively, the control module (210) may be configured to output control signals to various components and systems of the electrical appliance which partially or fully restrict operation of the electrical appliance if the biometric scanner fails to sense a predetermined biometric reading from the user (e.g. a fingerprint). This may provide a further level of security in order to operate the electrical appliance which may be particularly useful where the electrical appliance is a stove top, oven or other device potentially dangerous to children. Yet alternatively, the key may be implemented by way of requiring the user to enter a pin code, password, a pattern code or the like via the graphical user interface of the touch-sensitive display to enable operation of the electrical appliance.

Any one of the functional modules and systems comprised by the embodiments described herein may be implemented by way of software for execution by various types of processors. Executable code may, for instance, comprise one or more physical or logical blocks of computer instructions which may, for instance, be organised as an object, procedure, function, or algorithm. The identified blocks of computer instructions need not be physically located together but may comprise disparate instructions stored in different locations which, when joined logically together, comprise the module and achieve the stated purpose for the module. Functional modules of the embodiments may also be implemented as hardware circuitry comprising custom circuits or gate arrays, off-the-shelf semiconductors such as logic chips, transistors, or other discrete components. Functional modules may also be implemented in programmable hardware devices such as field programmable gate arrays, programmable array logic, programmable logic devices or the like. Executable code may comprise a single instruction, multiple instructions, and may be distributed over several different code segments, among different programs, and across several discrete memory devices. Similarly, operational data may be identified and illustrated herein within devices, units, and the like and may be embodied in any suitable form and organised within any suitable type of data structure. The operational data may be collected as a single data set, or may be distributed over different locations including over different storage devices, and may exist, at least partially, merely as electronic signals on a system or network.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

We claim:

1. A control system for use in controlling operation of an electrical appliance, the control system including:
    an electrical appliance housing having disposed therein:
        a control module; and
        a power source;
    a control knob including:
        an attachment element configured for releasably attaching the control knob to an outer surface of the housing; and
        an input/output module;
    a wireless power transfer system configured for wirelessly transferring power from the power source through the electrical appliance housing and to the input/output module for use in powering the input/output module;
    a wireless control signaling module configured for wirelessly communicating a control signal from the control knob through the housing to the control module within the electrical appliance housing, said control signal received by the control module being indicative of a an operational position or operational state of the control knob, and whereby said control module is configured for controlling operation of the electrical appliance by reference to the received wireless control signal; and
    wherein the input/output module of the control knob further includes a biometric scanner for sensing a predetermined biometric signature of a user whereby the electrical appliance is configured to be automatically switched off when the biometric scanner fails to sense the predetermined biometric signature of the user, and wherein the biometric scanner is powered by power that is wirelessly transferred from the power source to the input/output module by the wireless power transfer system.

2. The control system as claimed in claim 1, wherein the input/output module includes at least one of a rotational encoder module a motion/gesture sensor module, an electronic display module, and a voice-input control module.

3. The control system as claimed in claim 2, wherein the electronic display module includes a touch-sensitive electronic display module.

4. The control system as claimed in claim 1, wherein the wireless control signaling module is operably-connected to the input/output module and the control signal is configured to include information indicative of an input received by the input/output module.

5. The control system as claimed in claim 1, wherein the input/output module includes at least one of a vibration output module, a sound output module, a light output module, and an electronic display module.

6. The control system as claimed in claim 1, wherein the control module is configured to restrict operation of the electrical appliance in response to the control knob being detached from the outer surface of the housing.

7. The control system as claimed in claim 1, wherein the control module is configured to receive the wireless control signal from the wireless control signaling module, said control signal including information indicative of an input received by the input/output module, and whereby the control module is configured to restrict operation of the electrical appliance if the information does not match a predetermined matching criteria.

8. The control system as claimed in claim 2, wherein the information indicative of the input received by the input/output module includes biometric information received by the biometric scanner module of the input/output module.

9. The control system as claimed in claim 1, wherein the attachment element configured for releasably attaching the control knob to the outer surface of the housing includes a magnetic attachment element.

10. The control system as claimed in claim 1, wherein the wireless power transfer system is configured to transfer power by way of at least one of inductive coupling and capacitive coupling.

11. The control system as claimed in claim 1, wherein the wireless control signaling module includes a radio frequency control signaling module.

12. The control system as claimed in claim 1, further including a computing device that is located remotely from the control system of the electrical appliance, the computing device being configured for running a user-interactive interface thereon via which a user may interact with the control system and to remotely control operation of the electrical appliance by wirelessly communicating control signals to the control system of the electrical appliance.

13. A control knob configured for use with a control system of in electrical appliance, the control system including:

an electrical appliance housing having disposed therein:

a control module; and a power source;

the control knob including:

an attachment element configured for releasably attaching the control knob to an outer surface of the housing; and an input/output module, wherein:

a wireless power transfer system of the electrical appliance is configured for wirelessly transferring power from the power source through the electrical appliance housing and to the input/output module of the control knob for use in powering the input/output module; and a wireless control signaling module of the electrical appliance is configured for wirelessly communicating a control signal from the control knob through the housing to the control module within the electrical appliance housing, said control signal received by the control module being indicative of an operational position or operational state of the control knob, and whereby said control module is configured for controlling operation of the electrical appliance by reference to the received wireless control signal; and the input/output module of the control knob further includes a biometric scanner for sensing a predetermined biometric signature of a user whereby the electrical appliance is configured to be automatically switched off when the biometric scanner fails to sense the predetermined biometric signature of the user, and wherein the biometric scanner of the input/output module is powered by power that is wirelessly transferred from the power source to the input/output module by the wireless power transfer system.

* * * * *